United States Patent [19]

Kobayashi et al.

[11] Patent Number: 5,096,741

[45] Date of Patent: Mar. 17, 1992

[54] CORROSIONPROOF COATING MATERIAL AND METHOD FOR FORMATION OF COATING THEREWITH

[75] Inventors: Toshihiro Kobayashi; Takafumi Kuwazawa; Toshimasa Kobayashi, all of Shimosuwa, Japan

[73] Assignee: Kabushiki Kaisha Sankyo Seiki Seisakusho, Japan

[21] Appl. No.: 623,460

[22] PCT Filed: Jun. 27, 1989

[86] PCT No.: PCT/JP89/00636

§ 371 Date: Dec. 19, 1990

§ 102(e) Date: Dec. 19, 1990

[30] Foreign Application Priority Data

Jun. 27, 1988 [JP] Japan .................. 63-156639

[51] Int. Cl.⁵ ............................. B05D 5/12

[52] U.S. Cl. .................. 427/127; 427/213.32; 427/213.33; 427/213.34; 427/213.36; 427/214; 427/216; 427/221; 427/379; 427/386; 427/424; 427/443.2

[58] Field of Search .............. 427/127, 213.32, 213.33, 427/213.34, 213.36, 214, 216, 221, 379, 386, 424, 443.2

[56] References Cited

FOREIGN PATENT DOCUMENTS 53-102928 9/1978 Japan .
54-45341 4/1979 Japan .
61-223062 3/1986 Japan .

Primary Examiner—Bernard Pianalto
Attorney, Agent, or Firm—Welsh & Katz, Ltd.

[57] ABSTRACT

The present invention relates to a corrosionproof coating material characterized by including a triazine derivative possessing a thiol group, and accordingly being effective for coating an extremely air oxidizable metallic material and processed articles thereof, such as a rare earth-iron-boron type permanent magnet, that are easily oxidizable in the air.

10 Claims, 3 Drawing Sheets (a)

(b)

(c)

T: Triazine dithiol
E: Epoxy compound

CORROSIONPROOF COATING MATERIAL AND METHOD FOR FORMATION OF COATING THEREWITH

FIELD OF THE INVENTION

This invention relates to a corrosionproof coating material and a method for the formation of a coating with the material. More particularly this invention relates to a corrosionproof coating material to be used for coating the surface of a metal easily oxidizable in the air and a method for the formation of a coating with the material. This invention further relates to a corrosionproof coating material to be used for coating the surface of a rare earth-iron-boron type permanent magnet or the like and a method for the formation of a coating with the material.

BACKGROUND OF THE INVENTION

Heretofore, metallic materials and processed products thereof which are chemically active and, therefore, are easily oxidizable in the air have been posing various problems due to the occurrence of corrosion or rust. Great technical efforts have been being made for the solution of these problems In the case of a permanent magnet made of an intermetallic compound using rare earth-iron or rare earth-cobalt as a main component thereof, for example, the surface of the magnet rusts because of the compound's easy oxidizability and the formation of the oxide on the magnet's surface degrades the output of the magnetic circuit and the oxide shed from the surface smears devices disposed nearby. Thus, the rust entails various problems.

Techniques have been heretofore proposed for forming on the surfaces of magnets and other similar metallic articles varying corrosionproof and rustproof coatings. To be specific a method which forms an antioxidant forming coating by the use of a phosphate, a chromate etc. [Japanese Patent Laid-Open SHO 60(1985)-240,105], methods which form a coating of such metal as Zn by vacuum evaporation, ion plating, etc. [Japanese Patent Laid-Open SHO 61(1986)-185,910 and Japanese Patent Publication SHO 55(1980)-34,570], and methods which form a resinous coating by the use of resinous materials such as acryl resin and epoxy resin [Japanese Patent Laid-Open SHO 59(1984)-162,239 and Japanese Patent Laid-Open SHO 59(1984)-163,806] have been known in the art.

The inventor's test on permanent magnets provided with the aforementioned corrosionproof coatings has revealed that though these coatings are invariably effective in rustproofing the magnets to a certain extent the degrees of effect are not necessarily sufficient and the coatings are incapable of retaining a rustproofing effect long under the impact of aging.

Further, the forming coatings produced by the use of a phosphate, a chromate etc. have the possibility of deteriorating the physical properties of the coated metals and degrading the performances of the metals. In the case of the magnet mentioned above for example the passivation of the magnet's surface gives rise to a nonmagnetic altered layer, which goes to deteriorate the magnet's properties, etch the components of the magnetic powder alloy, and weaken the magnet's strength.

The method which consists in forming a coating of such metal as Zn has the problem that the device used for the formation of this coating is complicated and bulky and the method itself is deficient in operational efficiency, incapable of mass-production, and apt to prove expensive. The method which consists in forming a resinous coating requires the coating to be formed in a large thickness in due consideration of the possible occurrence of a porous texture in the applied layer of resin and the thick coating of resin consequently formed has the possibility of inconveniencing the application for which the coated article is intended. In the case of a permanent magnet of the kind described above, for example, when the magnet is used as a rotor magnet for a motor, the motor is inevitably required to interpose a large air gap between the rotor and the stator at an inevitable sacrifice of motor torque.

An object of this invention is to provide a novel corrosionproof coating material and a method for the formation of a coating therewith. Another object of this invention is to provide a corrosionproof coating material possessing a highly prominent rustproofing effect and a method for the formation of a coating therewith. Still another object of this invention is to provide a corrosionproof coating material capable of manifesting a rustproofing effect without impairing the characteristics of a metal being coated and a method for the formation of a coating therewith. Yet another object of this invention is to provide a corrosionproof coating material fit for mass production at a low cost and for formation of a thin film and a method for the formation of a coating therewith. A further object of this invention is to provide a corrosionproof coating material usable advantageously for coating the surface of a rare earth-iron-boron type permanent magnet and a method for the formation of a coating therewith.

DISCLOSURE OF THE INVENTION

The objects described above are accomplished by a corrosionproof coating material which is characterized by comprising at least a triazine derivative possessing a thiol group tannic acid or a derivative thereof and a resinous material.

This invention resides essentially in coating the surface of a magnetic body requiring a coating with a coating material by mixing and stirring a thiol group-containing triazine derivative tannic acid or a derivative thereof and a resinous material in a volatile solvent thereby preparing a corrosionproof coating material solution, applying the corrosionproof coating material solution to the surface of the magnetic body requiring a coating, expelling the volatile solvent from the applied layer of the solution by vaporization, and thereafter baking the applied layer of the solution.

To be specific, this invention is direction to a method for the formation of a coating, wherein the coating material mentioned above can be applied in a uniform thickness to the surface of a magnetic body by mixing and stirring the thiol group-containing triazine derivative the tannic acid or derivative thereof and the resinous material in the volatile solvent thereby preparing the corrosionproof coating material solution, placing the magnetic body in a rotary container, keeping the container in rotation and at the same time, supplying the corrosionproof coating material solution into the container thereby allowing the corrosionproof coating material solution and the magnetic body to come into mutual contact, air-drying the wet article thereby expelling the volatile solvent from the applied layer of the solution on the magnetic body by vaporization, and thereafter baking the applied layer of the corrosionproof coating material.

This invention also discloses a method for the formation of a coating by dissolving a thiol group-containing triazine derivative and tannic acid or a derivative thereof in a volatile solvent, immersing a magnetic powder in the resultant solution draining and air-drying the wet mass of magnetic powder thereby expelling the volatile solvent by vaporization and forming a corrosionproof coating of the thiol group-containing triazine derivative and a coating of the tannic acid or a derivative thereof on the surface of the magnetic powder, further heat-treating the coated powder, then causing the magnetic powder coated with the thiol group-containing triazine derivative and the tannic acid or a derivative thereof to be mixed in a volatile solvent with a resinous material intended to bind and solidify the magnetic powder and to form a corrosionproof coating by binding itself with the thiol group-containing triazine derivative, and the tannic acid or a derivative thereof and further draining and air-drying the resultant mixture.

The triazine derivatives which are usable for this invention include those represented by the following general formula:

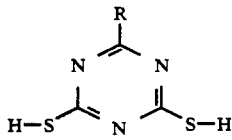

[wherein —R stands for —SH, —N(CH$_3$)$_2$, —NHC$_6$H$_5$, —N(C$_4$H$_9$)$_2$, —N(C$_8$H$_{17}$)$_2$, —N(C$_{12}$H$_{24}$)$_2$ or —N(CH$_2$CH=CH$_2$)$_2$.], for example.

This invention is further directed to a corrosionproof coating material, wherein the resinous material mentioned above has as main components thereof the product of esterification of a polycarboxylic acid and a polyol and an epoxy compound capable of being cross-linked with the product of esterification through the addition reaction.

BEST MODE OF EMBODYING THE INVENTION

Figure 1:
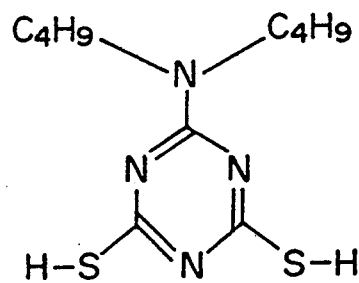
FIG. 1 is a diagram illustrating the structure of a triazine derivative in a working example of this invention.

Now, this invention will be described in detail below with reference to embodiments thereof.

The corrosionproof coating material of this invention is characterized by containing at least a triazine derivative possessing a thiol group tannic acid or a derivative thereof and a resinous material.

The thiol group-containing triazine derivative which are usable for this invention come in various kinds. Among other kinds, the kind having at least two thiol groups and the kind having at least two functional groups including thiol and other functional group prove to be particularly desirable. For example, the thiol group-containing triazine derivatives represented by the following general formula may be mentioned as concrete desirable species. Of course, this invention is not limited to these examples.

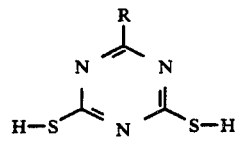

[wherein —R stands for —SH, —N(CH$_3$)$_2$, —NHC$_6$H$_5$, —N(C$_4$H$_9$)$_2$, —N(C$_8$H$_{17}$)$_2$, —N(C$_{12}$H$_{24}$)$_2$ or —N(CH$_2$CH=CH$_2$)$_2$.]

The resinous component to be used in the corrosionproof coating material of this invention has no particular restriction except for the sole requirement that it should be capable of forming an effective coating on an article requiring a coating, i.e. a metal or a processed article thereof, when it is spread thereon. Though thermoplastic resins are usable as the resinous material, such thermosetting resins as epoxy resin unsaturated polyester resins urea resin, melamine resin, and phenol resin are used preferably. It is particularly desirable to use epoxy resins or alkyd resin-modified epoxy resins or other similar epoxy resins in combination with other resins.

As desirable representatives of these resinous materials, those which have as main components thereof the product of esterification of a polycarboxylic acid and a polyol destined to form an alkyd resin-modified epoxy resin and an epoxy compound capable of being cross-linked with the product of esterification through the addition reaction may be cited. Besides, those which have as main components thereof a polyphenol and/or a phenol resin precondensate and a curing agent and those which have as main components thereof a polyphenol and/or a phenol resin precondensate and an epoxy compound may be cited as desirable examples.

The polycarboxylic acids which are usable for the esterification mentioned above include maleic acid, maleic anhydride, fumaric acid, phthalic acid, phthalic anhydride, citric acid, isocitric acid, aconitic acid, tricarballylic acid, and 1,2,3,4-butanetetracarboxylic acid. These acids may be used either singly or in the form of a mixture of two or more members.

The polyols which are usable for the esterification mentioned above include ethylene glycol, propylene glycol, polyethylene glycol having a molecular weight of not more than 600, polypropolyene glycol having a molecular weight of not more than 600, glycerin, diglycerin, pentaerythritol, dipentaerythritol, trimethylol ethane, trimethylol propane, and butane diol. These polyols may be used either singly or in the form of a mixture of two or more members.

The epoxy compounds which are usable in this invention include bisphenol A, novolak type phenol resins, diglycidyl ethers obtained by the reaction of hydroquinones with epichlorohydrin, diglycidyl ester type epoxy compounds such as diglycidylphthalic acids, alicyclic epoxy compounds, and heterocyclic epoxy compounds, for example.

Further the corrosionproof coating material of the present invention only incorporates therein the tannic acid or derivative thereof as a third component other than the thiol group-containing triazine derivative and the resinous material.

The tannic acid and derivatives thereof which are usable in this invention include tannic acid, polytannic acid, etherified tannic acid, and esterified tannic acid, for example. (Incidentally, polytannic acids are represented by the following formula, for example.

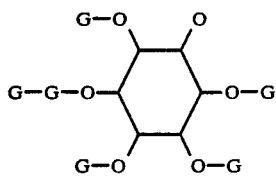

wherein G stands for

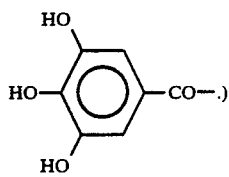

The corrosionproof coating material of this invention, when necessary, may incorporate therein a coupling agent and an inorganic filler, for example.

The corrosionproof coating material of this invention manifests a prominent rustproofing effect when it is used in coating the surface of varying metallic materials and processed articles thereof which are easily oxidizable in the air. It is used particularly desirably in coating the surface of a magnetic body especially a rare earth-iron, rare earth-cobalt, or rare earth-iron-boron type permanent magnet. The application to the permanent magnet is only one desirable example and does not limit in any sense the use of the corrosionproof coating material of this invention.

Incidentally the rare earth-iron-boron permanent magnet mentioned above possesses outstanding characteristics as compared with the rare earth-cobalt permanent magnet (such as, for example, samarium-cobalt permanent magnet) which is a typical rare earth magnet. Since it uses as a rare earth metal such a light rare earth component as neodymium (Nd) supplied amply and inexpensively and avoids using expensive and rare cobalt, it can be produced rather inexpensively and supplied stably and, therefore, can be expected to find extensive utility in a wide range of applications.

The rare earth metals which are usable in the magnetic power mentioned above include yttrium (Y) and light rare earth and heavy rare earth elements. At least one element selected from those mentioned above is used. Desirably, such light rate earth elements as Nd and Pr are used as main components. Otherwise, a mixture of rare earth elements including Nd or Pr may be used. The amount of such a rare earth element to be used is desired to be in the range of 12 to 20 atomic percent.

In the magnetic powder mentioned above, the iron (Fe) content is desired to be in the range of 65 to 80 atomic percent and the boron (B) content in the range of 4 to 24 atomic percent.

In addition to the metal, iron, and boron, the magnetic powder tolerates technically inevitable impurities. It may incorporate therein additives useful for the enhancement of magnetic properties in a relatively small amount.

Figure 4:
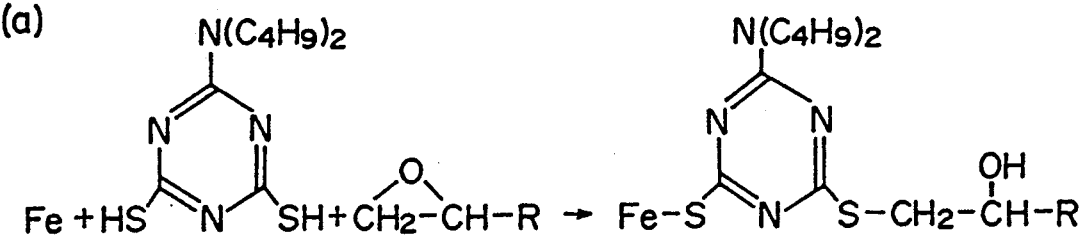
FIG. 4 (a) to FIG. 4 (c) are diagrams illustrating the mechanism of reactions of a corrosionproof coating material according with the present invention.
Figure 4:
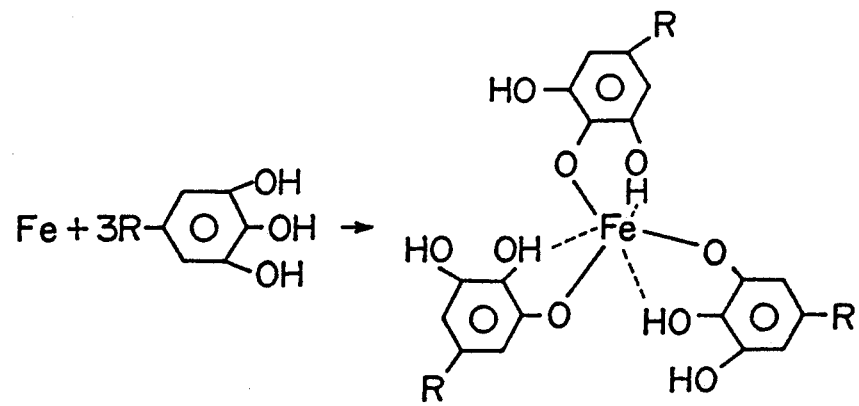
Figure 4:
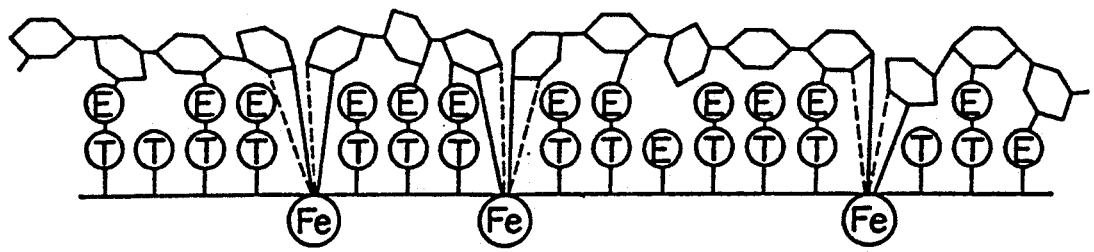

The mechanism of the performance of the corrosionproof coating material of this invention manifested in rustproofing a given metallic material and the mechanism of the reaction produced by the corrosionproof coating material of this invention still remain yet to be elucidated in numerous aspects. What is depicted in FIG. 4 may offer a logical explanation of these mechanisms.

(a) The metal (Fe or Nd) in the magnetic powder forming an object for coating such as, for example, a permanent magnet and the thiol group as a component element of the triazine derivative in the coating material of this invention are mutually bonded through adsorption. Further, to the other functional group of the triazine derivative, e.g. the other thiol group in the case shown in FIG. 4, the functional group of the resinous material, e.g. the epoxy group in this case, is bonded as accompanied by ring opening. As the result, a tenacious coating of the triazine derivative and the resin is formed on the surface of the magnetic body mentioned above.

(b) Further, tannic acid or a derivative thereof incorporated in the coating material forms a 3- or 2-coordination chelate with the metallic ion such as, for example, the Fe ion in the magnetic powder forming a permanent magnet and the tannic acid or the derivative thereof form a 3- or 2-coordination chelate and gives rise to a coating of tannic acid or derivative thereof on the surface of the magnetic body.

(c) The resinous material such as an epoxy resin and tannic acid or a derivative thereof owing to their compatibility, undergo a cross-linking reaction and give rise to a coating capable of closely covering the portion escaping the coating of (a) and the coating of (b) (the unaltered portion relative to the magnet).

It is, therefore, inferred that the close coating is formed by the strong union and the synergistic action between the aforementioned components in the corrosionproof coating material as one part and the metal of the magnetic body as the other part or between the components of the corrosionproof coating material by themselves.

The application of the corrosionproof coating material of this invention to the surface of the magnetic body may be effected as follows, for example.

First, a corrosionproof coating material dope is prepared by mixing and stirring in a volatile solvent the thiol group-containing triazine derivative the tannic acid or derivative thereof and the resinous material. Preferably, the corrosionproof coating material dope incorporates tannic acid or a derivative thereof as described above. This corrosionproof coating material dope can be selectively adapted for the specification of film thickness and the conditions of treatment by being diluted to a proper concentration.

Then, the corrosionproof coating material solution obtained by optionally diluting the corrosionproof coating material dope to a proper concentration is applied by the barrel method to the surface of the magnetic body to give rise to a coating on the surface. The barrel method consists in coating the an object for coating, i.e., the magnetic body with a uniform layer of the aforementioned coating material by setting the object in place in a rotary container and keeping this container in rotation and, at the same time, pouring the corrosionproof coating material solution into the container thereby allowing the object and the solution to come into mutual contact.

Figure 3:
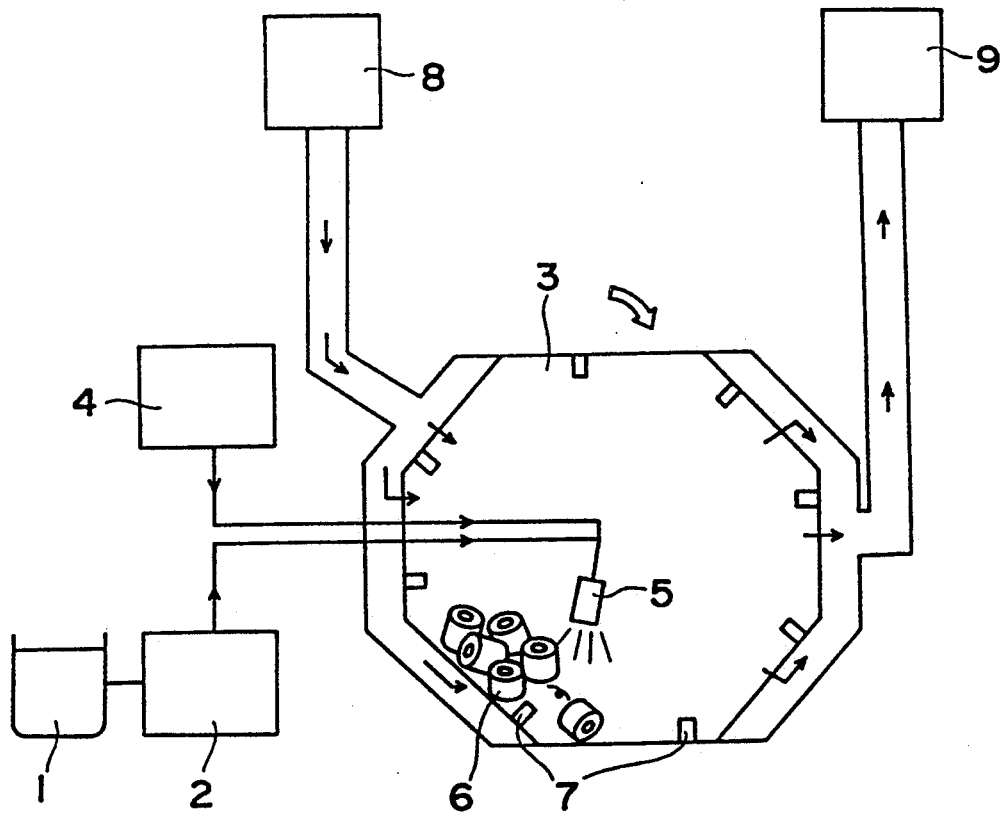
FIG. 3 is a diagram illustrating a typical device for the formation of a coating to be used in working the method of this invention for the formation of a coating.

FIG. 3 illustrates a typical device for working this barrel method. The diluted corrosionproof coating material solution is placed in a tank 1 and supplied with a spray device 2 into a barrel tank 3. In this case, it is spouted in the form of spray through a spray gun 5 into the barrel tank by means of compressed air supplied from a compressor 4. The amount of the solution to be discharged is set in the range of 0.5 to 5 g/min, preferably 2.5 to 1.9 g/min. In the barrel tank 3 is placed an object for coating (permanent magnets 6 in the present embodiment). This barrel tank 3 is rotated in itself at a rate approximately in the range of 10 to 60 rpm. preferably 25 to 35 rpm. The barrel tank 3 is provided on the inner wall surface thereof with rods 7 protruding inwardly. When the barrel tank is rotated, the rods 7 lift the permanent magnets to a prescribed angle of rotation and allow them to drop naturally and disperse. Where the magnets fall, the diluted corrosionproof coating material solution spouted through the spray gun 5 lands on the permanent magnets 6. An air feeding device 8 supplies hot air into the barrel tank 3 and an air discharging device 9 removes the hot air from the barrel tank 3. The hot air is heated and circulated so that the interior temperature of the tank is kept at a prescribed level such as, for example, about 60° C. As the result, the coating material is uniformly deposited on the surface of the permanent magnets as the supplied diluted coating material solution comes into contact with the permanent magnet and the solvent such as acetone for the diluted solution is expelled by vaporization.

After the rotation of the barrel tank 3 is stopped, the coated permanent magnets are dried for a prescribed period such as, for example, 0 to 10 minutes. Then, the permanent magnets 6 coated with the coating material are taken out of the barrel tank 3. Then, the permanent magnets coated with the coating material are heat-treated under the curing conditions for the resinous material to bake the coating material. As the result, the corrosionproof coating material of a desired wall thickness is formed on the surface of the permanent magnets.

The formation of the coating with the corrosionproof coating material of this invention can be effected not only by the barrel coating method described above but also by various other coating methods such as the dipping method and the spray method. The reason for this versatility of the manner of application is that the corrosionproof coating material solution of this invention permits easy adjustment of concentration and possesses a very low viscosity of several cps.

For the application of the coating material of this invention to a magnet of the resin-bonded type, the following method of formation may be employed. This method comprises dissolving a thiol group-containing triazine derivative in a volatile solution, immersing a magnetic powder in the resultant solution, draining and air-drying the wet mass of magnetic powder thereby expelling the volatile solvent by vaporization and forming a corrosionproof coating of the thiol group-containing triazine derivative on the surface of the magnetic powder, heat-treating the coated magnetic powder, causing the magnetic powder coated with the thiol group-containing triazine derivative to be mixed in a volatile solvent with a resinous material intended to bind and cure the magnetic powder and form a corrosionproof coating by binding itself with the thiol group-containing triazine derivative, and tannic acid or a derivative thereof intended to cover the portion escaping the above coating and further draining and air-drying the resultant mixture.

Now, the method for the formation of a coating will be described more specifically below with reference to one embodiment of the invention.

First, the preparation of a magnetic powder and the coating of the magnetic powder are carried out. The magnetic powder to be used is a rare earth-iron-boron type magnetic powder, for example.

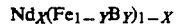

$$Nd_X(Fe_{1-Y}B_Y)_{1-X}$$

(wherein X stands for a number in the range of 0.14 to 0.40 and Y for a number in the range of 0.05 to 0.065).

For the magnetic powder to fill the resin in a high ratio, the magnetic powder is desired to contain particles exceeding 420 μm in diameter in a ratio of not more than 0.1% by weight and particles not exceeding 44 μm in a ratio of not more than 15% by weight. Of course, these ranges are not critical. The magnetic powder weighed out in a required amount and the solution of a thiol group-containing triazine derivative in a solvent are thoroughly stirred and mixed for thorough wetting of the magnetic powder. Then, the wet magnetic powder is left dipping for a prescribed period, such as for example, 10 minutes or more, then drained and air-dried to expel the solvent by vaporization, and heat-treated at a temperature in the range of 180° to 220° C. for about 10 minutes.

As the result, a thiol group-containing polar organic compound is chemically adsorbed as an inhibitor to a heavy metal, M (Fe or Nd) to give rise to an insoluble mercaptide which is one kind of a passive coating.

It suffices to form this corrosionproofing coating in a thickness on the order of several μm.

Figure 5:
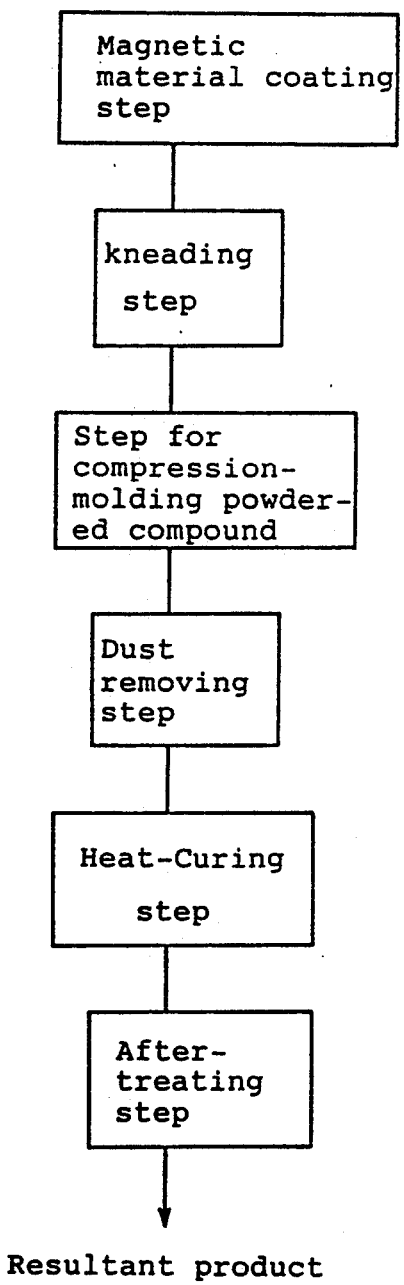
FIG. 5 is a flow chart illustrating the steps in one embodiment of the method of this invention for the formation of a coating.

Then, with the magnetic powder as a starting material, a resin-bonded magnet is produced by following the procedure shown in the flow chart of FIG. 5.

(1) Kneading step:

This step consists in preparing and kneading the magnetic powder, the resinous material and the tannic acid or derivative thereof.

First, the resinous material such as, for example, a binder resin made of an epoxy type resin (containing a curing agent) and the tannic acid or derivative thereof are uniformly deposited on the surface of the magnetic powder.

This deposition is desired to be effected by having the binder resin and the tannic acid or derivative thereof dissolved preparatorily in a suitable solvent, mixing the resultant solution with the aforementioned magnetic powder, blowing dry $N_2$ against the resultant mixture thereby crudely drying the mixture and protecting the magnetic powder against oxidation and expelling the solvent by vaporization, then vacuum drying the mixture thereby expelling the residual solvent.

The compound consequently obtained is disintegrated and pulverized in a nonmagnetic mortar. The powdered compound is passed through a sieve of 60-mesh under to acquire an adjusted particle diameter. The powder, when necessary, may incorporate therein a minute amount of a lubricant such as, for example calcium stearate. Thus is obtained a powdered compound to be treated by the following molding step.

(2) Molding step:

The compound produced as described above is compression molded to give rise to a resin-compression bonded magnet preform in a prescribed shape such as rings or tablets.

(3) Dust removing step:

The resin-compression bonded magnet preform obtained as described above is deprived of unnecessary magnetic powder adhering to the surface thereof by suction.

(4) Curing step:

Then, the magnet preform is heat-treated under the curing conditions for the resinous material to give rise to a resin-bonded permanent magnet.

(5) After-treating step:

This step is suitably carried out in consideration of possible fracture of the coating during the course of molding. Specifically the permanent magnet obtained as the result of the treatments mentioned above is treated with triazine. This triazine treatment is performed, similarly to the triazine treatment performed on the magnetic powder as described above, by the use of the dithiol group-containing triazine derivative, so as to coat the surface of the permanent magnet with the triazine derivative.

EXAMPLES

Now, this invention will be described more specifically below with reference to working examples. In the following working examples, rare earth iron-boron type permanent magnets easily oxidizable in the air were used as the object for rustproofing treatment. The formation of a corrosionproof coating material on the surface of magnetic powder and the surface of permanent magnets was carried out in accordance with the present invention. Of course, this invention is not limited in any respect to these working examples.

EXAMPLE 1

Figure 2:
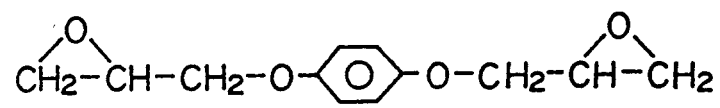
FIG. 2 is a diagram illustrating the structure of an epoxy compound in the working example of this invention.

First, a corrosionproof coating material of this invention was prepared. One container was filled with 21 g of dibutylaminotriazine dithiol powder, i.e. a thiol group-containing 1,3,5-triazine shown in FIG. 1 and 2.52 g of hydroquinone diglycidyl ether[1,4-bis(2,3-epoxypropyloxy)benzene] powder (produced by Nagase Chemical Industry K.K.), i.e. an epoxy compound shown in FIG. 2. Then, 300 ml of acetone and 3.36 g of 50% n-butanol solution of the product of esterification of polycarboxylic acid and polyol (produced by Mitsui Toatsu Chemicals Inc. and marketed under product code of "CE-800") were placed additionally in the container and stirred with the previous contents thereof. Further, the resultant mixed solution and 260 g of a 30% polytannic acid solution (produced by Taikoku Kako K.K. and marketed under product code of "K-polymer L2") added thereto were thoroughly stirred. The mixed solution consequently formed was used as a coating material dope. This coating material dope was diluted with acetone to a total weight five times the original weight.

Then, the coating material solution thus obtained by diluting the coating material dope to five times the original weight was used to form a coating on the surface of a rare earth-iron-boron type permanent magnets by the barrel method described above. In the barrel method, the amount of the diluted coating material solution discharged was set in the range of 2.5 to 1.9 g/min and the revolution number of the barrel tank was set at 30 rpm and the interior temperature of the tank was kept at about 60° C. For about 5 minutes following the stop of the rotation of the barrel tank, the wet permanent magnets were dried. Then, from the barrel tank, the permanent magnets coated with the coating material were removed. The permanent magnets coated with the coating material were heat-treated at 200° C. for 20 minutes to bake the coating material. As the result, a corrosionproof coating 5 μm in thickness was formed on the surface of the aforementioned permanent magnets.

In the present example, the magnetic powder using as a main component thereof a rare earth intermetallic compound represented by the chemical formula, $Nd_2Fe_{14}B$, (the magnetic powder containing particles exceeding 420 μm in diameter in a ratio of not more than 0.1% by weight and particles not more than 44 μm in diameter in a ratio of not more than 15% by weight) itself was coated with dibutylaminotriazine dithiol and the rare earth-iron-boron type resin-bonded permanent magnet was produced by binding the magnetic powder with a binding agent. The method employed for the production of the permanent magnets will be described briefly below. This method comprised immersing the aforementioned magnetic powder in a 10% acetone solution of dibutylaminotriazine dithiol, draining and air-drying the wet mass of magnetic powder thereby expelling the acetone by vaporization and uniformly coating the surface of the magnetic powder with the aforementioned dibutylaminotriazine dithiol (about 1to 2 μm in thickness), then causing the magnetic powder coated with dibutylaminotriazine dithiol to be bound with a binding agent, and curing the bound mass of the coated magnetic powder to give rise to the rare earth-iron-boron type resin-bonded permanent magnet. As the binding material, the resinous component in the corrosionproof coating material mentioned above, the component comprising the product of esterification of a polycarboxylic acid and a polyol and an epoxy compound capable of being cross-linked with the product of esterification through the reaction of addition, was used. The magnetic powder coated with the aforementioned dibutylaminotriazine dithiol was further clothed with the resinous material, then compression molded with a press under a pressure of 9 tons/cm², and thermally cured at 200° C. for 20 minutes, to give rise to a rare earth-iron-boron type resin-bonded permanent magnet. The permanent magnet thus obtained was tested for resistance to rusting. The results are shown in Table 1.

The test for rust resistance was performed by allowing a sample to stand under an atmosphere having a temperature of 60° C. and a humidity of 95% and visually evaluating the degree of rusting along the course of time. On the assumption that the completed magnet in the process of being incorporated in a certain device has the possibility of being smeared with the dirt from the hands of a worker, other sample was intentionally smeared with the dirt from the worker's hands before it was put to the test.

Concerning the ranking marks shown in Table 1, ⊙ stands for absence of rust (by observation under a microscope, ×100), ○ for absence of rust (by visual observation), Δ for presence of not more than 5 spots of rust by visual observation, ∇ for presence of not more than 15 spots of rust by visual observation, x for presence of rust on the entire surface by visual observation, and — for complete decay with loss of original shape.

EXAMPLE 2

On the surface of the same rare earth-iron-boron type resin-bonded magnet as used in Example 1, the formation of a coating was carried out by following the procedure of Example 1, excepting a coating material solution obtained by diluting the coating material dope with acetone to 15 times the original weight was used instead. In this case, the corrosionproof coating was formed in a thickness of 2 μm. The permanent magnet thus produced was tested for resistance to rusting in the same manner as in Example 1. The results are shown in Table 1.

EXAMPLE 3

On the surface of the same rare earth-iron-boron type resin-bonded magnet as used in Example 1, the formation of a coating was carried out by following the procedure of Example 1, excepting a coating material solution obtained by diluting the coating material dope with acetone to 3 times the original weight was used instead. In this case, the corrosionproof coating was formed in a thickness of 7 μm. The permanent magnet thus produced was tested for resistance to rusting in the same manner as in Example 1. The results are shown in Table 1.

EXAMPLE 4

On the surface of the same rare earth-iron-boron type resin-bonded magnet as used in Example 1, the formation of a coating was carried out by following the procedure of Example 1, excepting a coating material solution obtained by diluting the coating material dope with acetone to 3 times the original weight was used instead. In this case, the corrosionproof coating was formed in a thickness of 7 μm. The permanent magnet thus produced was tested for resistance to rusting in the same manner as in Example 1. The results are shown in Table 1.

EXAMPLE 4

On the surface of the same rare earth-iron-boron type resin-bonded magnet as used in Example 1, the formation of a coating was carried out by following the procedure of Example 1, excepting a coating material solution obtained by diluting the coating material dope with acetone to 2 times the original weight was used instead. In this case, the corrosionproof coating was formed in a thickness of 10 μm. The permanent magnet thus produced was tested for resistance to rusting in the same manner as in Example 1. The results are shown in Table 1.

EXAMPLE 5

On the surface of a rare earth-iron-boron type permanent magnet produced by preparing a magnetic powder without forming a corrosionproof coating, bonding this magnetic powder with the same epoxy compound as used in Example 1, and curing the bonded magnetic powder. The same corrosionproof coating (7 μm in thickness) as used in Example 3 was formed. The permanent magnet was tested for resistance to rusting in the same manner as in Example 1. The results are shown in Table 1.

EXAMPLE 6

On the surface of a rare earth-iron-boron type permanent magnet produced by preparing a magnetic powder without forming a corrosionproof coating, bonding this magnetic powder with the same epoxy compound as used in Example 1, and curing the bonded magnetic powder, the same corrosionproof coating (10 μm in thickness) as used in Example 4 was formed. The permanent magnet was tested for resistance to rusting in the same manner as in Example 1. The results are shown in Table 1.

COMPARATIVE EXPERIMENT

The surface of a rare earth-iron-boron type permanent magnet was coated with an epoxy type resin (about 10 μm in thickness). The permanent magnet used for the coating was a resin-bonded magnet produced by preparing a magnetic powder having as a main component a rare earth intermetallic compound represented by the chemical formula, $Nd_2Fe_{14}B$, bonding the magnetic powder with the same epoxy type resin as mentioned above, and curing resin. The permanent magnet was tested for resistance to rusting in the same manner as in Example 1. The results are shown in Table 1.

TABLE 1

| (Temperature 60° C. and humidity 95%) | | | | | | | |
|---|---|---|---|---|---|---|---|
| | | Degree of rusting | | | | | |
| | | As finished (without smear of dirt from worker's hand) | | | As smeared with dirt from worker's hand | | |
| | Thickness of film | Length of standing (hr) | | | Length of standing (hr) | | |
| | (μm) | 20 | 100 | 300 | 20 | 100 | 300 |
| Example 1 | 2 | ⊙ | ○ | Δ | ○ | ∇ | x |
| Example 2 | 5 | ⊙ | ○ | ○ | ○ | Δ | ∇ |
| Example 3 | 7 | ⊙ | ⊙ | ○ | ○ | Δ | ∇ |
| Example 4 | 10 | ⊙ | ⊙ | ⊙ | ⊙ | ○ | ○ |
| Example 5 | 7 | ⊙ | ○ | ∇ | ○ | ∇ | x |
| Example 6 | 10 | ⊙ | ○ | Δ | ○ | Δ | x |
| Comparature Experiment | 30 | ○ | Δ | x | x | — | — |

It is clearly noted from Table 1 that in the sample of comparative experiment, the oxide coating formed quickly on the surface of the magnet. Presumably this quick formation of the coating is ascribable to the presence of a porous texture in the formed resin coating. With elapse of time, the oxidation proceeded inwardly in the coating so much as to deteriorate magnetic properties and bring final disintegration of the coating. The samples of the working examples of this invention invariably excelled in corrosionproofness and, therefore, retained magnetic properties intact. They also excelled in tightness of adhesion between the coating material and the surface of the permanent magnet and, therefore, enjoyed high mechanical strength. Further, in the imaginary test performed on the assumption that the produced permanent magnet is destined to be smeared with the dirt of the worker's hand, the corrosionproof coatings of this invention manifested an ample rustproofing effect. It was further demonstrated that the rustproofing effect was enhanced by forming a corrosionproof coating on the surface of a permanent magnet and further coating the magnetic powder itself forming the permanent magnet with a thiol group-containing triazine derivative. i.e. one component of the corrosionproof coating material.

Further, in the resin coating of the shaped article according with the conventional practice (comparative experiment), the coating required a large thickness of 20 to 30 μm in attaining the same rustproofing effect as that produced by the method of this invention. As compared with the thickness of several μm of the corrosionproof coating of this invention, this large thickness constitutes itself a major defect from the standpoint of dimensional control of a shaped article. If the finished magnet of the comparative experiment was used in a motor, for example, the motor would be inevitably required to incorporate a large air gap at a sacrifice of the motor's characteristics. It was demonstrated that the use of the corrosionproof coating material of this invention resulted in elimination of the following inconveniences.

EXAMPLE 7

The magnetic powder used in this example was coated with a corrosionproof coating material of this invention. First, 1 kg of $Nd_2Fe_{14}B$ (containing particles exceeding 420 μm in diameter in a ratio of not more than 0.1% by weight and particles not exceeding 44 μm in a ratio of not more than 15% by weight) was thoroughly wetted by being stirred and mixed with 500 ml of a 10% acetone solution of dibutylaminotriazine dithiol, left dipping for about 10 minutes, then drained and air-dried for about 10 minutes to expel the solvent by vaporization, and heat-treated at 120° C. for 10 minutes.

As the result, the magnetic powder was chemically adsorbed on a heavy metal, M (Fe or Nd), with a 2,6-dithiol group-containing polar organic compound as an inhibitor, to give rise to an insoluble mercaptide as one kind of passive coating.

This corrosionproof coating was formed in a thickness of 3 μm.

Then the magnetic powder was used as a starting material to produce a resin-bonded magnet by a procedure shown in the flow chart of FIG. 5.

This production was specifically effected by first dissolving 29 g of a binder resin (2.1 phf) composed of an epoxy type powder resin (50% n-butanol solution) and a curing agent in 200 ml of acetone placed in a nonmagnetic mortar, mixing the resultant solution with 1 kg of the aforementioned magnetic powder, blowing dry $N_2$ against the resultant mixture thereby roughly drying the mixture and protecting the magnetic powder against oxidation and expelling the solvent by vaporization. The weight loss during the course of this procedure was 9.5% to 11.4%.

Then, the mixture was vacuum dried for 4 hours to expel the The compound thus obtained was disintegrated and pulverized in a nonmagnetic mortar and passed through a sieve of 60-mesh under to obtain a powder of adjusted particle diameter. A powder-compressed compound was produced by mixing the powder with 0.01% by weight of calcium stearate as a slip additive.

A resin-compression bonded magnet preform in the form of rings or tablets was produced by compressing the compound with a hydraulic press under a pressure of 9 tons/cm$^2$.

The resin-compression bonded magnet preform obtained as described above was deprived of unnecessary magnetic powder adhering to the surface thereof by suction.

A resin-bonded permanent magnet was produced by thermally curing the preform at 200° C. for 20 minutes.

Several of the samples were treated again with triazine after the step of molding described above. Similarly to the triazine treatment performed on the magnetic powder, this treatment with triazine was performed with a dithiol group-containing triazine derivative shown in FIG. 1 to coat the surface of permanent magnet with the triazine derivative.

The resin-bonded permanent magnets produced as described above was tested for rustproofing property, compression strength, and magnetic properties. The results are shown in Table 2 and Table 3. The conventional method shown in Table 2 was a comparative experiment using a non-treated sample and intended for comparison with the method of this invention (with the aftertreatment omitted). Table 3 showing the results of the triazine treatment covers the samples having only the magnetic powder coated and the samples having both the magnetic powder and the permanent magnet preform coated.

TABLE 2

| | Treatment | This Invention | Conventional method |
|---|---|---|---|
| Magnetic properties | Residual magnetic flux density (G) | 6800 | 6770 |
| | Coercive force (Oe) | 4980 | 4960 |
| | Maximum energy product (MGOe) | 8.65 | 8.55 |
| | Surface magnetic flux density (G) | 2058 | 2076 |
| Physical Properties | Density (g/cm$^3$) | 5.82 | 5.97 |
| | Compression strength (kg/mm$^2$) | 4.56 | 2.35 |
| | Corrosionproofness | O | X |

TABLE 3

(Temperature and humidity test - 60° C., 90%)

| | Time (hr) | | |
|---|---|---|---|
| Sample | 20 | 100 | 200 |
| No treatment | X | X | X |
| Triazine treatment (magnetic powder) | O | Δ | Δ |
| Triazine treatment (magnetic powder + preform) | O | O | O |
| Resin coat (8 μm) | Δ | X | X |

It is noted from Table 2 that the samples obtained by the method of this invention were comparable substantially evenly with the untreated samples with respect to magnetic properties and superior to the untreated samples with respect to compression strength. The untreated samples of Table 3 quickly formed an oxide coating and suffered their magnetic properties deteriorated by the oxidation which advanced inwardly in the coating with elapse of time. The permanent magnet samples provided with a resin coating inevitably suffered their magnetic properties deteriorated with elapse of time owing to the occurrence of oxidation from the interior due to the presence of a porous texture in the coating.

It is clearly noted from Table 2 and Table 3 that the coating produced by the method of this invention manifested a prominent rustproofing effect. It is particularly noteworthy that, while the magnetic powder molded by the rapid cooling method in the production of a resin-bonded magnet posed the deficiency in mechanical strength as a problem, the magnetic powder provided with an organic coating by the treatment with triazine was allowed to acquire about twice as high mechanical strength as the magnetic powder in the resin-bonded magnet owing to the active union of the triazine with the epoxy resin as the inherent binder and the consequent synergistic effect.

The fact that the problem of corrosion which is the gravest defect for the rare earth-iron-boron type magnet can be coped with in the step of the preparation of the magnetic powder prior to the step of molding naturally contributes in a large measure to preclude the otherwise inevitable demagnetization by oxidation under the impact of aging.

It is further noteworthy that the resin coating formed on a shaped article by the conventional method is required to have a thickness of 20 to 30 μm to acquire the same rustproofing effect as the coating produced by the method of this invention. This large thickness of the coating, as compared with the thickness 3 μm of the triazine coating, constitutes itself a major defect from the standpoint of the dimensional control of a shaped article. In the light of the degradation of characteristics due to the incorporation of an unduly large air gap inevitably entailed by the use of the resin-coated magnet in the motor, the effectiveness of the method of this invention stands out.

ECONOMIC UTILITY OF THE INVENTION

The corrosionproof coating formed with the corrosionproof coating material of this invention excels in corrosionproofness, exhibits strong adhesiveness to the article being coated, permits easy control of film thickness, and manifests high corrosionproofness with an extremely small thickness as described above. Thus, it is suitable for use on articles which high dimensional accuracy. The method of this invention excels the conventional method in terms of function and cost. The corrosionproof coating material of this invention, therefore, is usable advantageously for coating magnetic powders, various metals, and processed articles thereof.

Further, in the treatment of a resin-bonded magnet, since the magnetic powder itself can be given an effective coating treatment, the permanent magnet produced by using the coated magnetic powder is allowed to restrain to a far greater extent the possible degradation of magnetic properties resulting from the interior deterioration under the impact of aging as compared with the magnet produced by coating the preform.

We claim:

1. A method for the formation of a coating, which comprises mixing and stirring a thiol group-containing triazine derivative, tannic acid or a derivative thereof and a resinous material in a volatile solvent thereby preparing a corrosionproof coating material solution, coating the surface of a magnetic body with said corrosionproof coating material solution, then expelling said volatile solvent by vaporization, and thereafter baking the applied layer of corrosionproof coating material.

2. A method according to claim 1, wherein a corrosionproof coating material is deposited in a uniform thickness on the surface of said magnetic body by mixing and stirring a thiol group-containing triazine derivative, tannic acid or a derivative thereof and a resinous material in a volatile solvent thereby preparing a corrosionproof coating material solution, placing said magnetic body in a rotary container, keeping said container in rotation and, at the same time, pouring said corrosionproof coating material solution into said container thereby allowing said corrosionproof coating material solution to come into contact with said magnetic body, air-drying the coated article thereby expelling said volatile solvent therefrom by vaporization, and thereafter baking the coated article.

3. A method according to any of claims 1 or 2, wherein said magnetic body is a permanent magnet formed of a rare earth, iron, and boron.

4. A method according to any claims 1 or 2 wherein said thiol group-containing triazine derivative is represented by the following general formula:

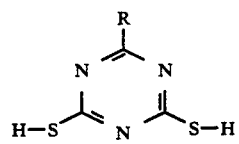

5. A method according to claim 1 or 2, wherein said tannic acid or derivative thereof is selected from the group consisting of tannic acid, polytannic acid, etherified tannic acid, and esterified tannic acid.

6. A method according to any of claims 1 or 2, wherein said resinous material comprises a polyol ester of a polycarboxylic acid and an epoxy compound capable of being cross-linked with said polyol ester of a polycarboxylic acid through an addition reaction.

7. A method for the formation of a coating, which comprises dissolving a thiol group-containing triazine derivative and tannic acid or a derivative thereof in a volatile solvent, immersing a magnetic powder in the resultant solution, draining and air-drying the wet mass of magnetic powder thereby expelling said volatile solvent therefrom by vaporization and forming a corrosionproof coating of said thiol group-containing triazine derivative said tannic acid or derivative thereof on the surface of said magnetic powder, heat-treating the coated magnetic powder, then causing said magnetic powder coated with said thiol group-containing triazine derivative and said tannic acid or a derivative thereof to be kneaded in a volatile solvent with a resinous material intended to form a corrosionproof coating by binding with said thiol group-containing triazine derivative and said tannic acid or a derivative thereof, and draining and air-drying the resultant mixture.

8. A method according to claim 7, wherein said magnetic powder is a magnetic powder using as main components thereof a rare earth, iron, and boron.

9. A method according to claim 7, wherein said thiol group-containing triazine derivative is represented by the following general formula:

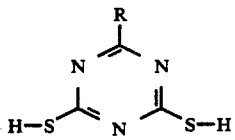

10. A method according to claim 7, wherein said resinous material comprises the product of a polyol ester of a polycarboxylic acid, and an epoxy compound capable of being cross-linked with said polyol ester of a polycarboxylic acid through an addition reaction.

* * * * *